Feb. 27, 1951           L. H. MORIN           2,543,418
APPARATUS FOR FORMING AND APPLYING BOTTOM STOPS
Filed Jan. 10, 1950           2 Sheets-Sheet 1
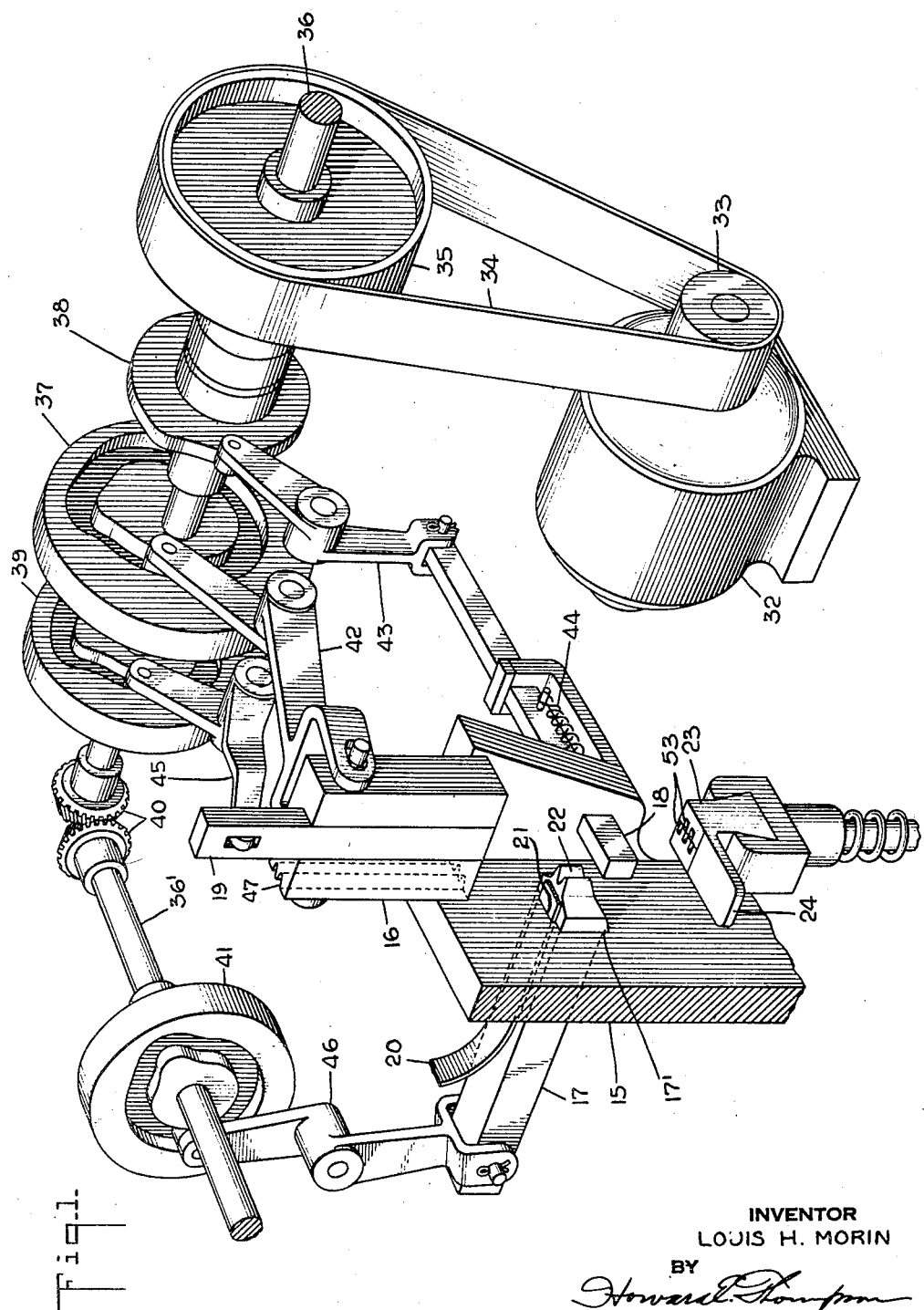
INVENTOR
LOUIS H. MORIN
BY
*Howard F. Thompson*
ATTORNEY

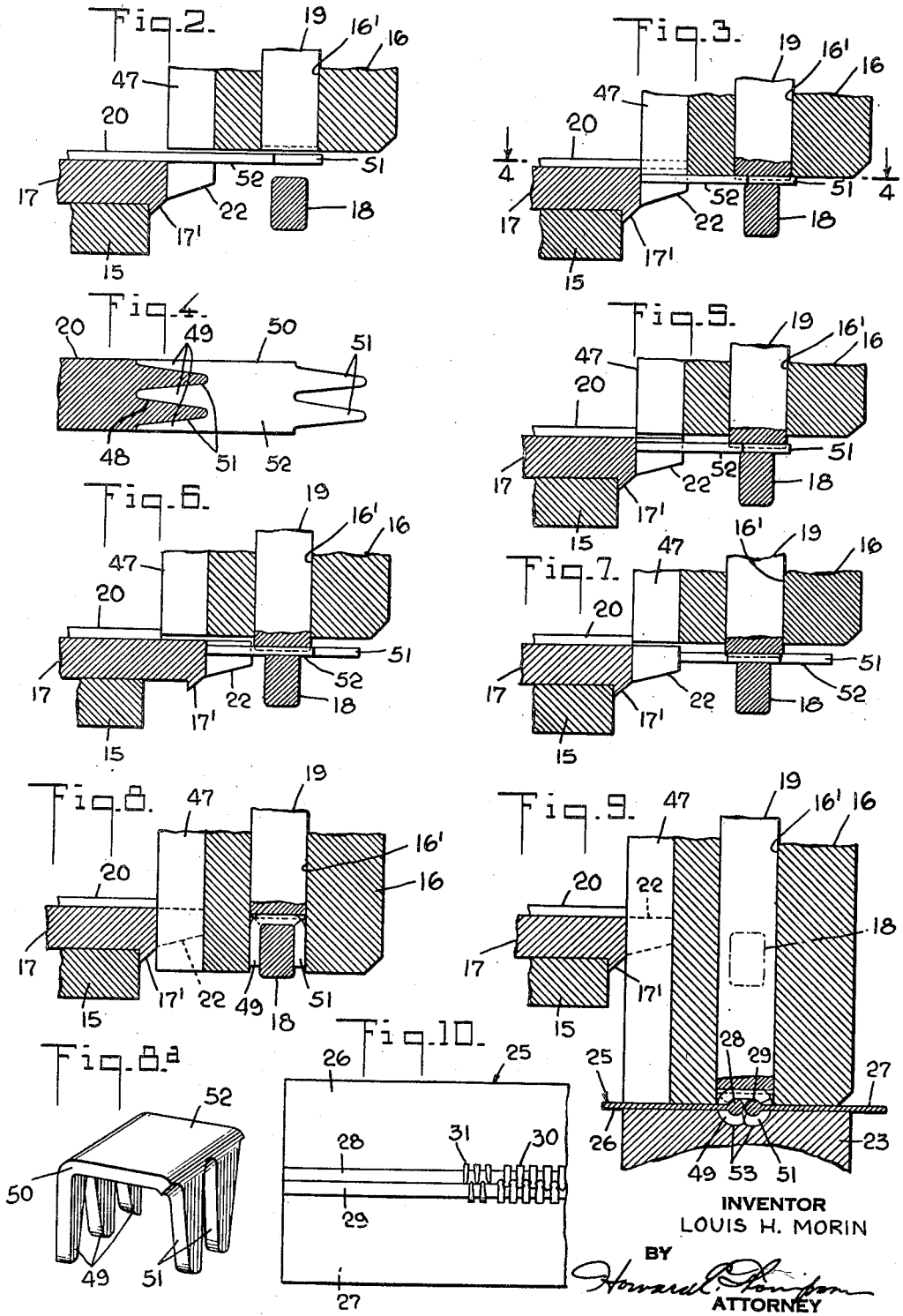

Patented Feb. 27, 1951

2,543,418

UNITED STATES PATENT OFFICE 2,543,418

APPARATUS FOR FORMING AND APPLYING BOTTOM STOPS

Louis H. Morin, Bronx, N. Y.

Application January 10, 1950, Serial No. 137,703

6 Claims. (Cl. 1—2)

1

This invention relates to improvements in the method and apparatus for forming and applying securing devices to an article. It relates more particularly to the formation and applying of bottom stops to the lower ends of separable fastener stringer tapes so as to couple the stringers together and also to limit the downward movement of a slider on the stringers.

The present invention provides a method and apparatus, wherein a bottom step having a plurality of tape piercing prongs is fashioned from elongated strips or ribbons of metal without waste and in such a manner, as to prevent the edge of the body portion of the bottom stop which extends between the tape piercing prongs from cutting or damaging the tape when the prongs are forced through the tape and are clinched by a clinching anvil.

The novel features of the invention will be best understood from the following description, when taken together with the accompanying drawing, in which, certain embodiments of the invention are disclosed and, in which, the separate parts are designated by suitable reference characters in each of the views and, in which:

Fig. 1 is a diagrammatic perspective view illustrating the basic mechanisms of an apparatus for actuating the various tools of a machine in carrying-out the method, parts of the construction being broken away and the arrangement of parts being schematic.

Fig. 2 is a detail sectional view showing the lower portion of the shearing tool and plunger, the punch and knife block and workpiece feed member illustrating the stock in advanced position, preparatory to forming a workpiece.

Fig. 3 is a view similar to Fig. 2 showing the method of severing a workpiece from the stock.

Fig. 4 is a plan view showing the stock in section and the severed workpiece in full lines.

Figs. 5 to 8, inclusive, are views similar to Figs. 2 and 3, showing successive steps in shaping the workpiece.

Fig. 8a is a perspective view of the workpiece shaped in accordance with the teachings in Fig. 8.

Fig. 9 is a view similar to Figs. 3 to 8, inclusive, showing the final clinching operation and illustrating the clinching anvil; and Fig. 10 is a rear face view of one end portion of stringer tapes joined by one of my improved bottom stops.

In order to illustrate actuation of the various tools in carrying-out the method, as illustrated in Figs. 2 to 9, inclusive, I have diagrammatically illustrated, in Fig. 1, a means for operating the various elements and, in this figure, 15 represents crudely part of the machine frame, in which a plunger 16 constituting a combination shearing and forming tool, the knife block or cutting anvil 17 and the forming anvil 18 are slidably mounted.

Slidably mounted in the plunger 16 is a punch 19 and, at 20, is shown the strip or ribbon stock, which is suitably guided, as at 21, in the frame to be centered over the twin knife portions or serrated edge 22 of the cutting anvil 17. For purposes that will appear later, the cutting anvil is reciprocable horizontally or transversely with respect to the shearing tool 16.

In vertical alinement with the punch 19 and at a predetermined distance below the forming anvil 18 is a yieldably supported clinching anvil 23 having a widely extending plate or table 24 for the support of a separable fastener 25, note Fig. 10. The fastener 25 comprises two stringers 26, 27 having adjacent beaded edges 28, 29 coupled together by scoops, as at 30, and these beaded edges, adjacent the end scoops, are adapted to be secured together by a resulting bottom stop 31 formed and attached, as later described.

In Fig. 1, I have diagrammatically indicated at 32 a motor over the drive pulley 33 of which passes a belt 34 operating on a pulley 35 of a cam shaft 36. On the shaft 36 there is a plunger operating cam 37, a forming anvil actuating cam 38 and a punch operating cam 39. Shaft 36, through bevel gears 40 or other suitable means, drives a supplemental cam shaft 36', to which is secured a cam 41 for reciprocating the cutting anvil 17. The cam 37 operates the plunger 16 through a suitable link and lever mechanism, as at 42, a similar mechanism 43 transmitting the action of the cam 38 to the forming anvil 18, tensional means, as at 44, being employed to maintain the lever mechanism 43 in constant engagement with the surface of the cam. A link and lever mechanism 45 is employed to transmit the action of the cam 39 to the punch 19. A link and lever mechanism 46 is employed to transmit the action of the cam 41 to the cutting anvil 17.

As previously set forth, the entire illustration in Fig. 1 is schematic, to illustrate means for actuating the various tools in performing the operations which are illustrated more in detail in Figs. 2 to 9, inclusive, which figures show the successive steps of operation of the tools.

The plunger 16 has the shearing tool portion at one side thereof, as indicated at 47, note Fig. 1, positioned so it mates with the twin knives or serrated edge 22 of the cutting anvil 17. Thus, the downward vertical movement of the plunger 16 will sheer the stock 20 along the zig-zag line indicated at 48 in Fig. 4 of the drawing which forms three prongs 49 at one side of a workpiece 50 and leaves two prongs 51 at the end of the stock 20. Similar prongs 51 form the prongs at the other end of the workpiece being formed, as will appear from a consideration of the right side of the workpiece 50, as shown in Fig. 4. The prongs 50 and 51 are connected by a central body portion 52 which has edges extending between the bases of the prongs at its ends. By forming the prongs in this manner there is no waste of any of the stock from which the workpiece is cut.

In the downward movement of the plunger 16 to shear the stock, the workpiece is moved onto the upper surface of the forming anvil 18 with the three prongs 49 disposed within the area of the deep knife portions 22 of the cutting anvil 17. However, at this position, the punch 19 and forming anvil extend over portions of the prongs 51, as seen in Fig. 3.

The arrangement of the punch 19 and the forming anvil 18 at this position is necessitated in providing for the plurality of prongs 49 and in order to bend the workpiece exactly at the points where the prongs 49 and 50 join the body 52 so that the edges of the body will not cut or damage the tape, the workpiece must be shifted so that the body 52 is directly over the forming anvil 18 prior to bending. This is accomplished by raising the plunger 16 to the position shown in Fig. 5, while leaving the punch 19 at rest, and then moving the cutting anvil 17 to the right, as seen in Fig. 6, to centralize the workpiece 50 upon the anvil and beneath the punch 19, in other words, to bring the central body portion 52 of the workpiece in alinement with the punch and to dispose the prongs in extended positions at opposed sides of the punch.

The next step in the operation consists in returning the cutting anvil 17 to its original position, which movement is checked by a stop 17' on the member and is illustrated in Fig. 7 of the drawing.

The next step in the operation consists in again moving the plunger 16 downwardly, while retaining the punch 19 in fixed position, holding the workpiece 50 upon the forming anvil 18. The result of this operation is seen in Fig. 8, in which the workpiece 50 is fashioned into U-shaped formation with the prongs 49 and 51 extending downwardly and disposed between the sides of the forming anvil 18 and the walls of the bore 16' of the plunger 16.

The next step in the operation consists in retracting the forming anvil from beneath the workpiece 50 and then to continue downward movement of the plunger 16 together with the punch 19 until the plunger is brought into engagement with the stringer tapes 26 and 27 to securely hold the tapes upon the upper surface of the anvil 23, after which the punch 19 moves downwardly to pierce the prongs 49 and 51 through the stringers 26, 27 and to clinch the same upon the beads 28 and 29 by the forming sockets 53 of the anvil 23, the result of which operation is illustrated in Fig. 9 of the drawing.

After completing this operation of attaching the resulting end stop 31, the parts are returned to the normal position shown in Fig. 2, the separable fastener 25 removed and a new fastener placed in position, after which the operation is again repeated. A new length of the stock is advanced by suitable feed means to the position, seen in Fig. 3, preparatory to forming the next successive workpiece, similar to the workpiece 50.

For purposes of description, the machine may be said to have two stations: first, a workpiece cutting, centralizing and shaping station, and an article supporting station in alinement with the centralized article in the first station and utilizing one of the tools at the first named station to deliver the shaped or formed workpiece onto the article and employing a clinching tool or anvil at the article supporting station to clinch the workpiece onto the article by actuation of the punch. In the foregoing description, the invention has been illustrated as applied to machines and methods for attaching what is known as bottom stops to the stringers of separable fasteners. More generally speaking, the machine and method comprises the formation of what can be termed a staple blank which is the workpiece and attaching this blank to any type and kind of support.

I claim:

1. In a machine for forming and applying bottom stops to tapes of separable fastener stringers wherein a workpiece having a plurality of article piercing prongs at at least one end and a body portion located between the ends thereof is cut from flat strip stock and is shaped for application to said tapes after being cut from the stock, the combination of a cutting anvil having a serrated cutting edge, said cutting anvil having a horizontally reciprocable portion engaging with the severed end of the workpiece, a vertically reciprocable shearing and forming tool having a shearing edge mating with the serrated cutting edge of the cutting anvil, an independently movable punch carried by said shearing and forming tool, a forming anvil located beneath said punch and means for reciprocating the horizontally reciprocable portion of the cutting anvil to position the body of the workpiece directly over the forming anvil upon said workpiece being severed from the strip of stock.

2. In a machine for forming and applying bottom stops to tapes of separable fastener stringers wherein a workpiece having a plurality of article piercing prongs at at least one end and a body portion located between the ends thereof is cut from flat strip stock and is shaped for application to said tapes after being cut from the stocks, the combination of a horizontally reciprocable cutting anvil having a serrated cutting edge, a vertically reciprocable shearing and forming tool having a shearing edge mating with the serrated cutting edge of the cutting anvil, an independently movable punch carried by said shearing and forming tool, a retractable forming anvil located beneath said punch, means for raising the shearing and forming tool while maintaining said punch and said forming anvil in engagement with a workpiece, and means for reciprocating the horizontally reciprocable cutting anvil upon said shearing and forming tool being raised.

3. A machine for forming and applying a bottom stop to separable fastener stringer tapes wherein a workpiece for forming the bottom stop having a plurality of tape piercing prongs at at least one end and a flat body portion located between the ends thereof is cut from flat strip stock by relative movement between a shearing and forming tool having a serrated shearing edge and a cutting anvil having a serrated cutting edge mating with said shearing edge and the cut workpiece is shaped for application to the tape by being bent over a forming anvil, said machine being characterized by movable tool means engaging endwise with the severed end of the workpiece upon the workpiece reaching the forming anvil, said tool means being reciprocable transversely with respect to the shearing and forming tool and being movable inwardly thereof a distance equal to the space between the inner ends of the tape piercing prongs on the workpiece and the edge of the forming anvil thereby positioning the body of the workpiece directly over the forming anvil.

4. A machine for forming and applying a bottom stop to separable fastener stringer tapes as defined in claim 3 wherein the transversely movable tool means comprises the cutting anvil and the shearing and forming tool has an independently movable punch associated therewith, said punch being arranged to engage with and hold the workpiece against the forming anvil during reciprocation of the cutting anvil.

5. A machine for forming bottom stops having a plurality of article piercing prongs at at least one end thereof from strip material without waste and applying said bottom stops to separable fastener stringer tapes without damage to the tapes which includes a setting and clinching anvil for supporting a pair of stringer tapes in position for application of a bottom stop thereto, a vertically reciprocable forming and shearing tool positioned above said setting and clinching anvil, a punch associated with said forming and shearing tool, said punch being in vertical alignment with said setting and clinching anvil and being vertically reciprocable with respect thereto independently of the forming and shearing tool, a cutting anvil cooperating with said forming and shearing tool upon downward movement thereof, said forming and shearing tool and said cutting anvil having mating edges shaped to shear a workpiece having a plurality of piercing prongs at the severed end thereof from a strip of stock fed therebetween, a retractable bending anvil positioned beneath said forming and shearing tool and engaging with the severed workpiece, means for reciprocating the cutting anvil transversely with respect to bending anvil and the forming and cutting tool upon severance of the workpiece, said reciprocation of the cutting anvil in one direction engaging said cutting anvil edgewise with the severed workpiece and positioning said workpiece with the bases of the prongs thereon positioned above the side edges of said bending anvil, means for feeding the forming and shearing tool downward with respect to said bending anvil and shaping the positioned workpiece thereon, means for withdrawing the bending anvil from beneath the shaped workpiece and means for moving the punch into engagement with the shaped workpiece and thereafter forcing the piercing prongs of said workpiece through the article and into clinching engagement with the clinching anvil.

6. In a machine for forming bottom stops from flat strip stock and applying the same to an article without damage thereto, the combination of means for severing a workpiece consisting of a body portion with a plurality of piercing prongs at the opposite ends thereof from a strip of flat stock, means for bending the prongs at right angles to said body, said bending means including a vertically reciprocable member and a retractible bending anvil offset laterally with respect to the center of the body of the severed workpiece, means for shifting the severed workpiece laterally with respect to said bending means to a position where the body of the workpiece is centered over the retractible bending anvil, vertically reciprocable punch means engaging with the bent workpiece for forcing the prongs of the workpiece through an article from one side and a clinching anvil engaging with the ends of the prongs on the other side of the article.

LOUIS H. MORIN.

No references cited.